United States Patent [19]

Hazebrouck

[11] Patent Number: 4,635,151
[45] Date of Patent: Jan. 6, 1987

[54] ROTARY ACTUATOR HAVING PRELOADED SPRING CRASH STOP

[75] Inventor: Henry B. Hazebrouck, Sunnyvale, Calif.

[73] Assignee: Priam Corporation, San Jose, Calif.

[21] Appl. No.: 694,704

[22] Filed: Jan. 25, 1985

[51] Int. Cl.$^4$ ............................................ G11B 21/06
[52] U.S. Cl. ...................................... 360/105; 360/97
[58] Field of Search .................................. 360/97–99, 360/104–106, 75; 310/10–12, 36

[56] References Cited

U.S. PATENT DOCUMENTS 4,110,802 8/1978 Ho et al. ............................ 360/106
4,346,416 8/1982 Riggle et al. ..................... 360/97 X
4,562,500 12/1985 Bygones ............................ 360/98 X

FOREIGN PATENT DOCUMENTS 2100052A 12/1982 United Kingdom ............... 360/105

Primary Examiner—John H. Wolff
Attorney, Agent, or Firm—Flehr, Hohbach, Test, Albritton & Herbert

[57] ABSTRACT

A crash stop assembly for use in a rotary actuator includes a folded leaf spring having two opposing spring arms joined by a base portion. The base portion is mounted to the rotary actuator with the spring arms maintained in compression. Projecting ears on the pivot block assembly of the rotary actuator engage the folded leaf spring to limit travel of the pivot block assembly.

7 Claims, 4 Drawing Figures

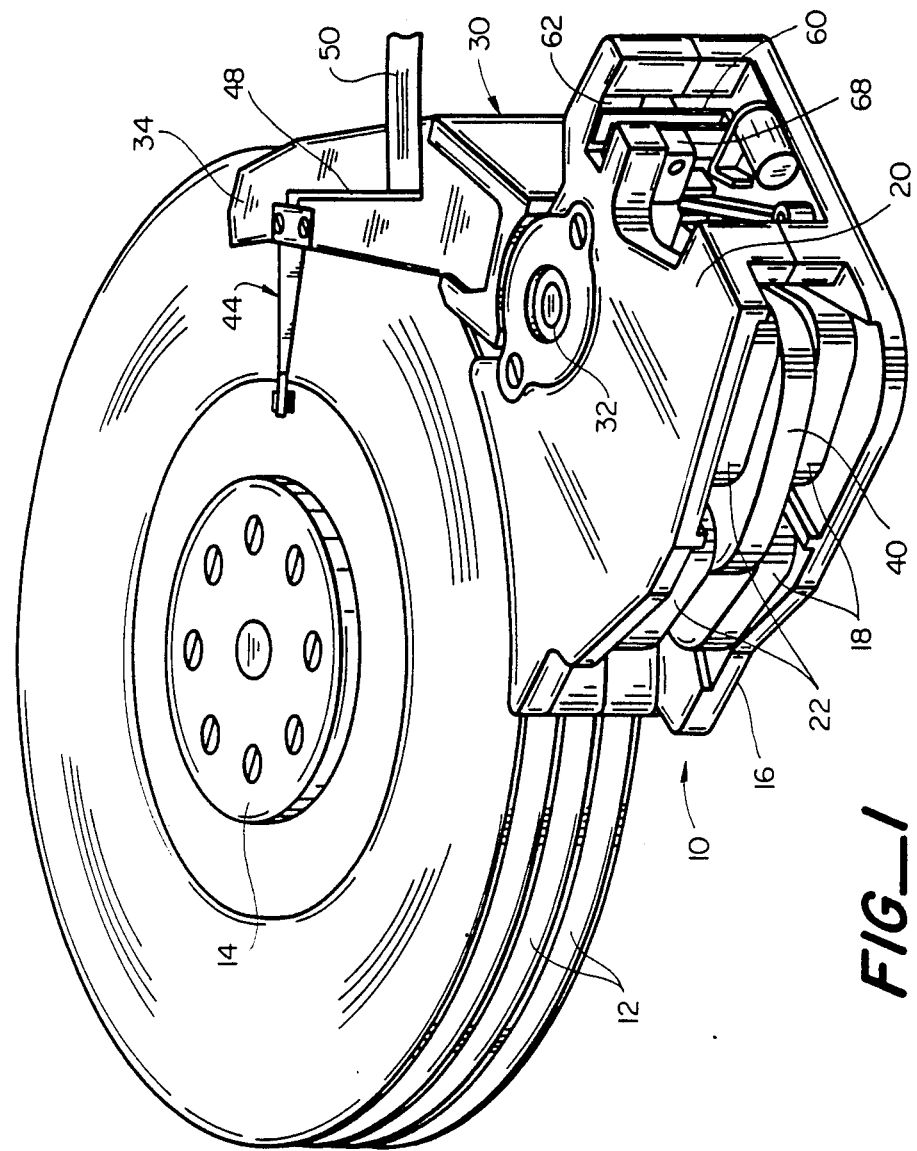
FIG_1

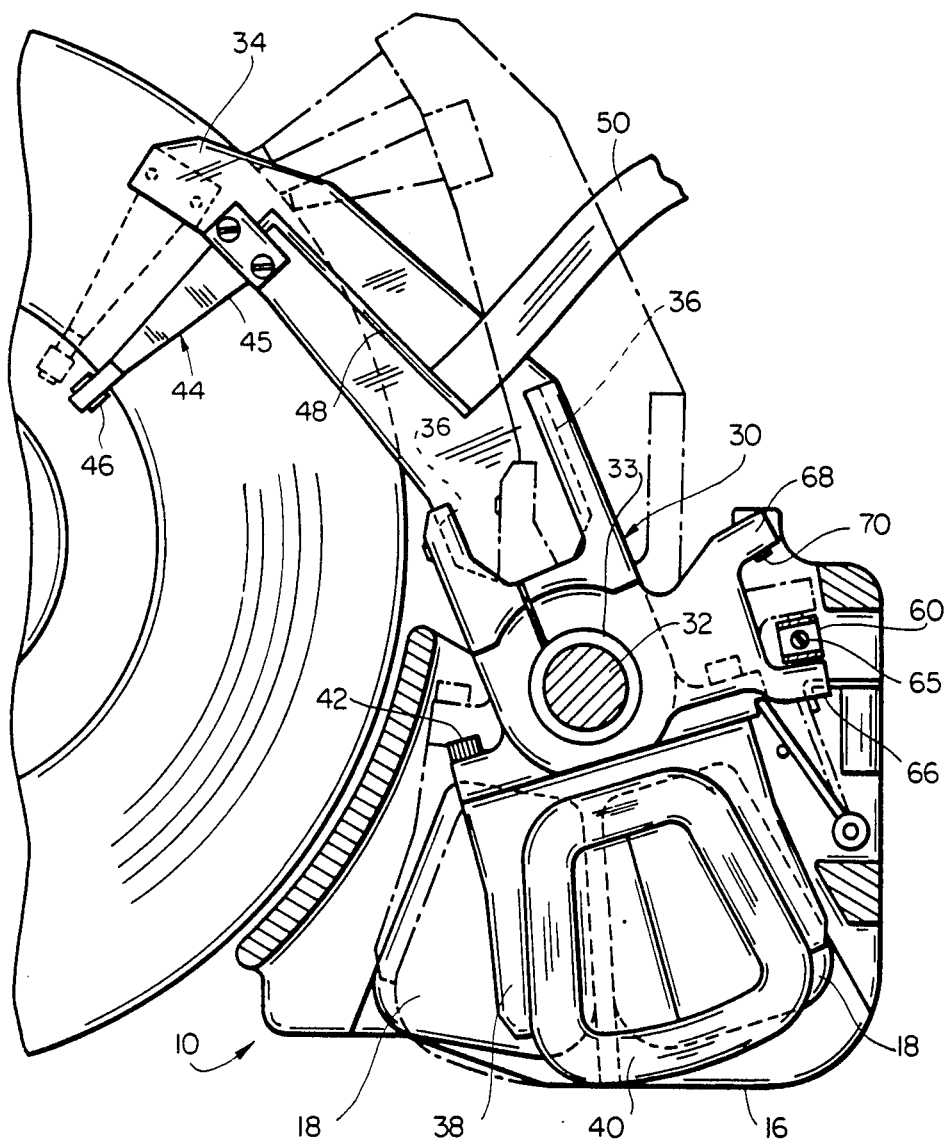
FIG_2

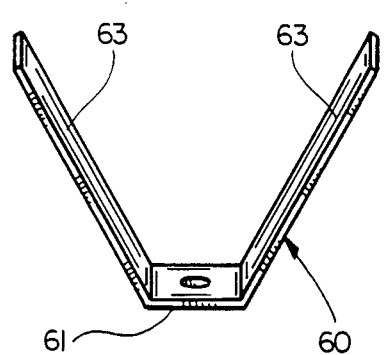
FIG_3
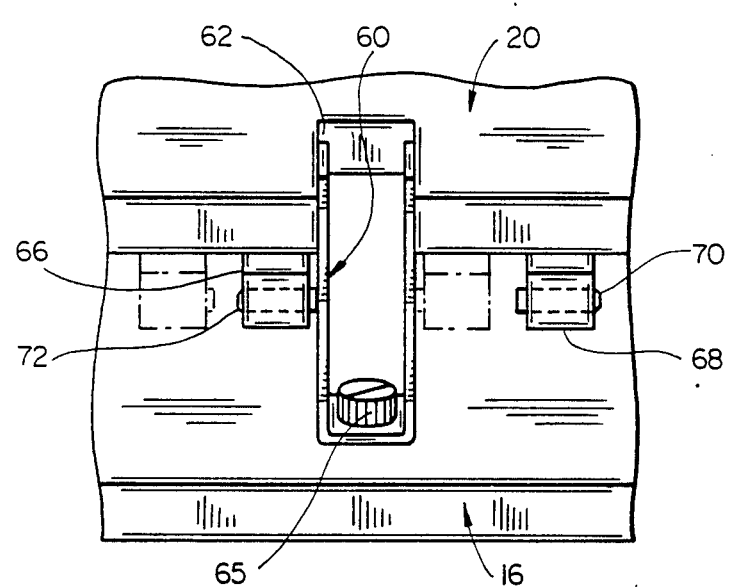
FIG_4

ROTARY ACTUATOR HAVING PRELOADED SPRING CRASH STOP

This application is related to the following copending applications:

Ser. No. 694,709, filed Jan. 25, 1985, for Rotary Actuator Having Removable Head Arms for Use in Magnetic Disc Drive, Henry B. Hazebrouck Ser. No. 694,797, filed Jan. 25, 1985, for Rotary Actuator Having Single Piece Support Structure, Henry B. Hazebrouck Ser. No. 694,708, filed Jan. 25, 1985, for Latch Mechanism for Rotary Actuator, Henry B. Hazebrouck This invention relates generally to rotary actuators for use in magnetic disc drives, and more particularly the invention relates to a crash stop for use in a rotary actuator.

Discs having magnetic coatings on the surfaces thereof provide memories for bits of data which can be randomly accessed at high speed for either retrieving or storing data. Typically, pickup heads are mounted on support arms with each head having a small pickup coil which is rapidly moved across a disc surface while a disc is spinning for detecting or storing data in concentric data tracks on the disc surface. The heads ride on a thin layer of air created by the spinning disc with the heads being in close proximity to but spaced from the disc surface.

The actuators for the pickup heads can move the head arm assembly linearly across the disc surfaces or rotatably across the disc surfaces. Because of the rapid movement of the actuator assembly, a device is needed to limit the deceleration of the recording heads during a malfunction. This device is often simply a piece of viscoelastic material at each limit of travel. The force exerted by this material is approximately proportional to its deflection so only at the end of its deflection are the recording heads experiencing maximum allowable deceleration. If the force could be held approximately constant, less deflection would be required to bring the actuating mechanism to a stop. Preloaded springs have been used to provide the decelerating force. See for example U.S. Pat. No. 4,237,504 for "Linear Actuator Including Limit Stop Assembly for Magnetic Disc Drive". The preloaded spring allows the declerating force to start at finite value upon initial contact by the actuating mechanism rather than starting at a zero decelerating force. This allows the actuator to come to a stop over a shorter distance, thus allowing more room on the disc surface for storing data.

The present invention is directed to a preloaded spring crash stop which comprises a single leaf spring. The leaf spring is attached to a stationary portion of the actuator structure and is maintained in compression in the rotation path of the rotary portion of the actuator. The rotary portion includes two projections or ears which engage the preloaded spring at either limit of travel of the rotary portion. A screw can be provided in one or both of the ears to readily adjust the limit of travel before engaging the limit stop.

Accordingly, an object of the present invention is a rotary actuator-including an improved limit stop assembly.

Another object of the invention is a limit stop assembly which is simple in structure.

The invention and objects and features thereof will be more readily apparent from the following detailed description and appended claims when taken with the drawing, in which:

FIG. 1 is a perspective view of a rotary actuator and spring crash stop in accordance with one embodiment of the invention.

FIG. 2 is a top plan view partially in section further illustrating the rotary actuator and spring crash stop of FIG. 1.

FIG. 3 is a perspective view of the leaf spring used in the crash stop of FIGS. 1 and 2.

FIG. 4 illustrates mounting of the leaf spring of FIG. 3 in the rotary actuator of FIG. 1.

Referring now to the drawings, FIG. 1 is a perspective view of a rotary actuator shown generally at 10 for accessing and storing data on a plurality of discs 12 mounted on a spindle 14. The rotary actuator 10 includes a first support structure 16 which accommodates magnets 18 and a second support structure 20 which supports magnets 22. The support structures 16 and 20 may comprise two pieces which are welded or brazed together to form a unitary structure. Alternatively, the structures 16 and 20 can be investment cast as a single piece.

The support structure supports a pivot block assembly which is illustrated in the top view partially in section of FIG. 2. The pivot block 30 fits over and is fastened to a bearing support shaft 32 which is mounted to bearings 33 in the support structure. The head arms 34 preferably fit into dovetail slots 36 on one side of the pivot block. On the opposite side of the pivot block 30 is a coil holder 38 in which a coil 40 is mounted by suitable means such as epoxy. The coil holder 38 is preferably a separate piece which is fastened to the pivot block by means of bolts 42. The coil 40 is flat and is suitable for a low profile drive.

Mounted to one end of the arms 34 are pickup head assemblies including flexures 45 and heads 46. Preferably, two pickup head assemblies 44 are mounted on opposing sides of each arm 34 with the heads 46 being generally coplanar and in staggered alignment. This allows closer spacing of the arms in the pivot block 30 and closer spacing of the discs. As shown in FIG. 1, electrical leads 48 connect the heads 46 with a ribbon cable 50 which in turn plugs into an electronic circuitry of the disc drive (not shown).

Mounted on a surface of the support structure 16 is a compressed leaf spring 60. As shown in the perspective view of FIG. 3, the leaf spring 60 includes a base portion 61 and opposing spring arms 63. The spring material can be beryllium copper, spring steel, or other suitable material which can be deflected the required amount without undergoing plastic deformation. Ends of the leaf spring are positioned within a slot 62 in the support structure 20. The pivot block includes two ears 66 and 68 which engage the compressed leaf spring at the ends of travel of the pivot block. Preferably, as shown in FIG. 4, ear 68 includes a screw 70 and ear 66 includes a screw 72 which can adjust the limit of travel of the ears 66, 68 and thus the limit of travel of the pivot block 30. The leaf spring 60 is attached to the support structure 16 by means of a screw 65.

Maintenance of the spring crash stop in compression allows the actuator to come to a stop over a shorter distance when the ears 66 and 68 engage the compressed spring. The spring stop assembly is simple in structure and readily accommodated in the support structure of the rotary actuator.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A rotary actuator and crash stop assembly comprising
    a support structure for supporting a plurality of magnets in spaced relationship and for supporting a pivot block assembly, said support structure including a slot for receiving and maintaining a leaf spring in compression,
    a plurality of magnets positioned in said support structure,
    a plurality of bearings mounted in said support structure,
    a shaft rotatably mounted in said bearings,
    a folded leaf spring having two opposing spring arms joined by a base portion, means affixing said base portion to said support structure with said two opposing spring arms positioned in compression in said slot, and
    a pivot block assembly mounted on said shaft for rotation therewith, said pivot block assembly including a coil extending from one side of said pivot block assembly and positioned between said plurality of magnets, at least one pickup head support arm extending from the opposite side of the pivot block assembly for positioning pickup heads, and two projecting ears, said leaf spring being positioned between said two projecting ears which engage said compressed leaf spring at the limits of travel of said pivot block whereby said leaf spring functions as a crash stop for said pivot block assembly.

2. The rotary actuator and crash stop assembly as defined by claim 1 wherein at least one of said projecting ears includes a screw for engaging said folded leaf spring and establishing the limit of travel of said projecting ear.

3. The rotary actuator and crash stop assembly as defined by claim 1 wherein said leaf spring comprises beryllium copper.

4. The rotary actuator and crash stop assembly as defined by claim 1 wherein said leaf spring comprises spring steel.

5. For use in a rotary actuator for limiting the travel of a pivot block assembly, a crash stop comprising a folded leaf spring having two opposing spring arms joined by a base portion, said base portion being mountable on said rotary actuator in compression and said arms being engageable by said pivot block assembly for limiting the travel of the pivot block assembly.

6. The crash stop assembly as defined by claim 5 wherein said leaf spring comprises beryllium copper.

7. The crash stop assembly as defined by claim 5 wherein said leaf spring comprises spring steel.

* * * * *